(12) United States Patent
Wetzel

(10) Patent No.: US 12,219,671 B1
(45) Date of Patent: Feb. 4, 2025

(54) HEAT LAMP

(71) Applicant: Animal Lamps, LLC, Iowa City, IA (US)

(72) Inventor: James Wetzel, Iowa City, IA (US)

(73) Assignee: Animal Lamps, LLC, Iowa City, IA (US)

( * ) Notice: Subject to any disclaimer, the term of this patent is extended or adjusted under 35 U.S.C. 154(b) by 0 days.

(21) Appl. No.: 18/240,131

(22) Filed: Aug. 30, 2023

Related U.S. Application Data

(63) Continuation of application No. 18/449,917, filed on Aug. 15, 2023, now abandoned.
(60) Provisional application No. 63/517,031, filed on Aug. 1, 2023.

(51) Int. Cl.
| | | |
|---|---|---|
| *H05B 3/24* | (2006.01) | |
| *A01K 1/02* | (2006.01) | |
| *H05B 3/00* | (2006.01) | |

(52) U.S. Cl.
CPC ............. *H05B 3/24* (2013.01); *A01K 1/0218* (2013.01); *H05B 3/0038* (2013.01)

(58) Field of Classification Search
None
See application file for complete search history.

(56) References Cited

U.S. PATENT DOCUMENTS

| | | | | |
|---|---|---|---|---|
| 1,686,865 A | * | 10/1928 | Klotz | F24C 7/065 607/81 |
| 2,277,697 A | | 3/1942 | Grier | |
| 2,795,724 A | | 6/1957 | Beeson | |
| 2,879,369 A | * | 3/1959 | Huseby | F24C 7/065 219/520 |
| 2,917,616 A | * | 12/1959 | Thomson | F24C 7/065 D23/385 |
| 3,139,881 A | * | 7/1964 | Fannon, Jr. | A01K 31/20 126/92 R |
| 3,179,789 A | * | 4/1965 | Gialanella | F24C 7/065 338/237 |
| 3,564,200 A | * | 2/1971 | Governale | F24C 7/043 165/53 |
| 3,786,230 A | * | 1/1974 | Brandenburg, Jr. | F24C 7/043 219/508 |
| 3,916,151 A | * | 10/1975 | Reix | H05B 3/50 392/440 |
| 4,319,125 A | * | 3/1982 | Prince | F24D 5/08 237/70 |
| 4,348,986 A | * | 9/1982 | Marrs | A01K 1/0218 119/508 |
| 4,390,125 A | * | 6/1983 | Rozzi | F23N 5/245 126/92 AC |

(Continued)

FOREIGN PATENT DOCUMENTS

| | | |
|---|---|---|
| DE | 202008003928 U1 | 5/2008 |
| GB | 1275977 A | 6/1972 |

*Primary Examiner* — Thor S Campbell
(74) *Attorney, Agent, or Firm* — SHUTTLEWORTH & INGERSOLL, PLC; Jason R. Sytsma

(57) ABSTRACT

A heat source that emits infrared radiation; a reflective sheet surrounding the heat source with a first emission area tuned to direct infrared energy directly downward out of the first emission area; and an outer sheet surrounding the reflective sheet with an insulation gap between the outer sheet and the reflective sheet with a second emission area directed downward out of the insulation gap.

14 Claims, 13 Drawing Sheets

(56) References Cited

U.S. PATENT DOCUMENTS

| | | | | |
|---|---|---|---|---|
| 4,626,659 | A | * | 12/1986 | Charmes ................ F24C 7/065 |
| | | | | 392/408 |
| 4,700,661 | A | | 10/1987 | Lawson |
| 4,703,154 | A | * | 10/1987 | Ikegami .................. H05B 3/30 |
| | | | | 219/544 |
| 4,727,854 | A | * | 3/1988 | Johnson .................... F24C 1/10 |
| | | | | 126/91 A |
| 4,766,524 | A | | 8/1988 | Ogawa et al. |
| 4,916,580 | A | | 4/1990 | Sano et al. |
| 5,049,725 | A | * | 9/1991 | Abramson ................ F26B 3/30 |
| | | | | 392/420 |
| 5,626,125 | A | * | 5/1997 | Eaves ....................... F24D 5/08 |
| | | | | 126/91 A |
| 6,138,662 | A | * | 10/2000 | Jones ....................... F24D 5/08 |
| | | | | 126/91 A |
| 6,154,606 | A | * | 11/2000 | Shaw ....................... F24C 7/065 |
| | | | | 392/360 |
| 7,254,319 | B2 | * | 8/2007 | Bonnin ................ H05B 3/0038 |
| | | | | 392/407 |
| 8,233,784 | B2 | * | 7/2012 | Zenteno ................ H05B 3/008 |
| | | | | 392/407 |
| 8,396,355 | B2 | * | 3/2013 | Jones ....................... F24D 5/08 |
| | | | | 392/407 |
| 9,237,605 | B2 | | 1/2016 | Andreasen et al. |
| 11,564,373 | B2 | | 1/2023 | Petersen |

* cited by examiner

HEAT LAMP

This application is a continuation of U.S. patent application Ser. No. 18/449,917 filed Aug. 15, 2023, which application claims the benefit of Provisional Application No. 63/517,031 filed Aug. 1, 2023, which are hereby incorporated by reference in their entirety.

TECHNICAL FIELD

This disclosure relates, generally, to a heat lamp, and, more specifically, this disclosure relates to a low wattage electrical heat lamp with thermo-regulation, artificial illumination, and targeted infrared emission.

BACKGROUND INFORMATION

Pork is the most consumed meat in the world. In the United States, it is a $23 billion industry with more than 60,000 pork producers. Iowa is the largest pork producing state in the country. Farmers sell their pork by the pound and continuously look for ways to optimize the health of their pigs to maximize yield. In a traditional farrowing operation, when close to birth, mothers (sows) are transferred to a crate within a room containing several crates. Each sow gives birth to and raises their piglets in a single crate for approximately three weeks. Sows require an ambient room temperature of approximately 72° F. for optimal health and maximum milk production.

New born and very young pigs lack adequate internal heat production to thrive in this environment, requiring, only inches from the sow, an ambient temperature of approximately 95° F. Therefore, rooms are kept at 72° F. for sows, and heat lamps are commonly used to create a warm zone within a crate for new born and young pigs. A common method is to suspend one or more heat lamps over the crates.

The infrared component of the electromagnetic spectrum consists of near, mid, and far infrared. Mammalian skin in general, pig skin in particular, and the water contents of a body, are exceptionally efficient absorbers of infrared radiation. Therefore, impinging infrared radiation readily transfers heat to a piglet, providing the external heat they need.

Prior art heat lamps for new born and young pigs typically use ~150 watt bulbs to provide heat. These light bulbs generally have a maximum stated life of approximately 6,000 hours, though, generally, fail far within 6,000 hours, and suffer from several shortcomings. To wit: light bulbs burn out at random. If this occurs overnight or otherwise unsupervised, piglets can go hours without heat, causing significant harm or death. Due to corrosion, light bulbs can become fused to their sockets making simply replacing a bulb an impossibility, requiring an entirely new lamp fixture to be installed. Light bulbs being made of glass, they break frequently before they burn out. Anything that enters a traditional facility must be sterilized; changing a light bulb and/or a fixture becomes a significant and expensive task.

Prior art heat lamps also provide uneven heat distribution. It is typically very hot in a small, basically circular, area below the heat lamp, hot enough to burn the animals, with the temperature decreasing rapidly from the center. The optimal temperature is a restricted annular area making it difficult for the piglets to find a comfortable place to lay. This contributes to lay-on mortality: the death of a piglet crushed by the sow. If a piglet cannot find heat from the lamp, it will seek it from its mother, who is very large and not always aware of the location of her piglets.

Prior art heat lamps provide heat to animals via infrared radiation produced by a resistive filament heated to a very high temperature contained within an evacuated glass bulb. The radiation emitted by this hot element follows the Stefan-Boltzmann radiation law, where, at a temperature of approximately 3000 K, the filament has an emission spectrum comparable to the Sun. This includes visible light as well as infrared light. Visible light does not heat the pigs but is used by farmers to see the goings on in the crate more easily, especially at night when farmers don't want to disturb the sows by turning on the overhead lights.

According to the Stefan-Boltzmann law, the hotter the filament, the more radiation is emitted. Heat is transferred via three processes: conduction, convection, and radiation. A hot object will transfer its heat to the cooler environment to reach thermal equilibrium with the environment. If it cannot easily conduct or convect heat away, radiation is the only mechanism for a hot object to reach thermal equilibrium with its environment. A light bulb is constructed with a vacuum around the filament to limit conduction and convection by air which would increase the rate of heat transfer away from the filament, lowering the temperature of the filament and thus reducing the amount of radiation it emits.

Prior art industrial heaters can heat large spaces by using extended tubular heating elements surrounded by a reflective shroud, energized electrically or via burned propane or the like, consuming large amounts of energy, heating the element to very high temperatures. As these elements are not kept under vacuum, these heating elements are designed to reach very high temperatures in order to offset the energy losses to conduction and convection which lower the element temperature and reduce the amount of radiation they emit. Any system that uses tubular heating elements directly exposed to the ambient air must be wary of draughts and other air currents that can quickly lower the temperature of the element, causing a significant drop in infrared radiation emission.

Considering the uneven heat distribution, visible spectrum emission, and fragility, prior art heat lamps are an overpowered, ill-suited, and inefficient method for heating several animals.

Accordingly, there is a need for an improved heat lamp with more even heat distribution, better durability, careful thermal management, and optimized infrared emission for maximum energy absorption.

SUMMARY

Disclosed herein is a heat lamp for heating a coverage area on a floor. The heat lamp comprises of a heat source that emits infrared radiation; a reflective sheet surrounding the heat source with a first emission area tuned to direct infrared energy directly downward out of the first emission area; and an outer sheet surrounding the reflective sheet with an insulation gap between the outer sheet and the reflective sheet with a second emission area directed downward out of the insulation gap. A total emission area of the heat lamp comprises of the first emission area plus the second emission area, with the total emission area is substantially equal to the coverage area of the heat lamp irrespective of a height of the heat lamp from the floor.

In an embodiment, an end reflector is positioned on opposite ends of the reflective sheet to combine the reflective sheet to the outer sheet. Each end reflector comprises of tabs that extend into corresponding slots in the outer sheet to minimize conduction of heat from the reflective sheet to the outer sheet. The reflective sheet can further comprise tabs on respective ends thereof. The end reflector comprises corresponding slots to receive the tabs of the reflective sheet to combine the reflective sheet to each end reflector while minimizing conduction of heat from the reflective sheet to each end reflector. Each end reflector comprises a receiving hole with at least two nubs projecting into the receiving hole for an effective diameter equal to a diameter of the heat lamp to minimize conduction of heat from the heat lamp to the end reflector which minimizes conduction of heat to the reflective sheet and the outer sheet. Each end reflector has a reflective surface to direct infrared radiation away from the outer sheet.

In an embodiment, a heat amplifier is formed by the insulation gap between the reflective sheet and the outer sheet. The heat amplifier emits heat by way of conduction out of the second emission area to the coverage area. In some embodiments, the reflective sheet is elongated with bilateral symmetry along a longitudinal axis with the reflective sheet folded to a generally parabolic-shape profile around the heat source. The reflective sheet can also further comprises of a plurality of heat reflective surfaces to maximize heat reflection downward out of the first emission area. The plurality of heat reflective surfaces can further comprise at least three heat reflective surfaces each of which is connected to its adjacent heat reflective surface at an obtuse angle to maximize reflection. The reflective sheet can be a polished reflective surface to reflect infrared radiation from the infrared heating element. In some embodiments, a tension hanger can extend a longitudinal length of the outer sheet to combine an electrical housing at one end to a cap at the other end. The tension hanger can further comprise of a threaded rod, a hook plate positioned on the tension hanger and rotatable about the threaded rod, and a locking nut that fixes a relative position of the hook plate to the outers sheet.

In an embodiment, an indicator light is connected in parallel to the heat source to project light out of the second emission area to provide a visual indication of the total emission area. A normally open electrical thermostat electrically can be connected between the indicator light and a power source that closes when a temperature in the insulation gap reaches a threshold level to signify that the heat source is operational. In some embodiments, the heat source is an infrared heating element.

In yet another embodiment, disclosed is a method of warming piglets in a coverage area on a floor of a farrowing pen. The method comprises providing a heat lamp comprising a heat source that emits infrared radiation, a reflective sheet around the heat source, and an outer sheet around the reflective sheet with an insulation gap between the outer sheet and the reflective sheet; and tuning an intensity of the infrared radiation at the coverage area based on a distance of the heat source from the floor of the farrowing pen, a wattage of the heat source, and a total emission area of the heat lamp.

In an embodiment, tuning the intensity of the infrared radiation at the coverage area comprises: constraining the Wattage of the heat source to 150 Watts, or constraining the distance of the heat source from the floor of the farrowing pen to 16 inches and constraining the coverage area to 100 square inches, or a combination of each.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
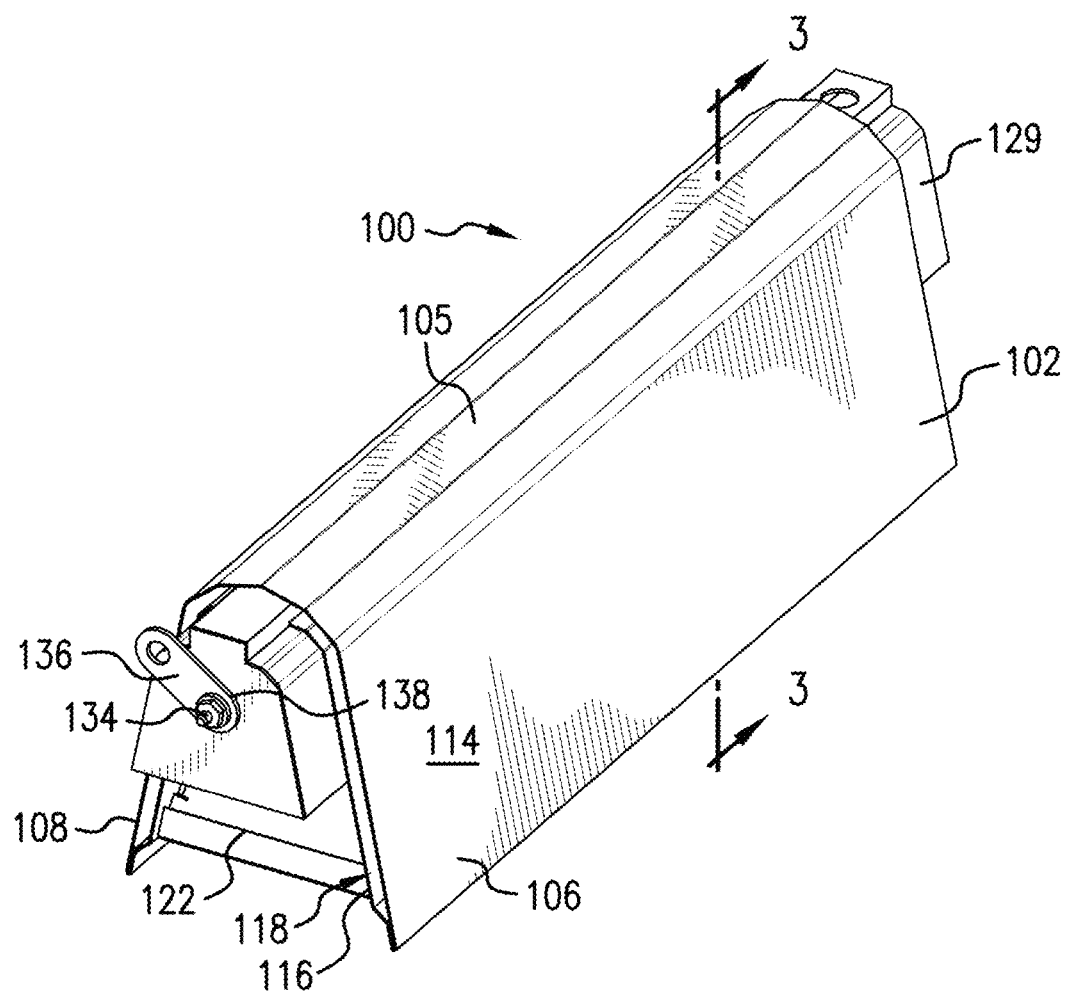
FIG. 1 is a front-side perspective view of a heat lamp according to this disclosure.
Figure 2:
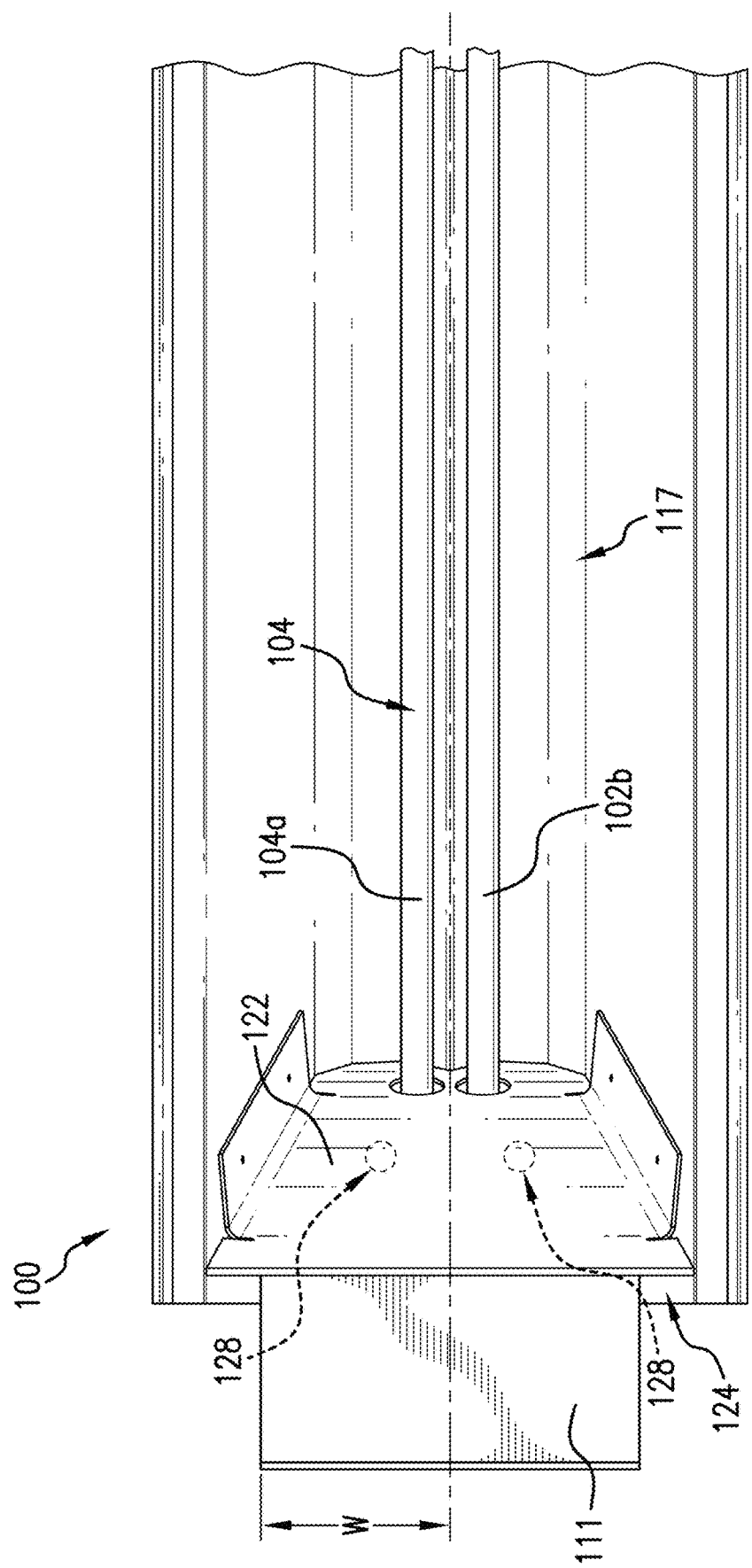
FIG. 2 is a bottom-side view of the heat lamp of FIG. 1.

Referring to FIGS. 1-2, shows is a heat lamp 100 according to this disclosure. Heat lamp 100 comprises of a shroud 102 that is basically u-shaped or parabolic-shaped with bilateral symmetry along a longitudinal length longer than its width. This configuration encompasses at least one heat source 104 generally surrounded by shroud 102 to reflect heat downward out the opening of shroud 102.

In an embodiment, heat source 104 comprises of a resistive infrared heating light. In the illustrated embodiment, heat source 104 is implemented as two resistive infrared heating lights 104a, 104b that extend the longitudinal length of shroud 102, alternatively a single heating light or a single u-shaped heating light can be used for heat source 104. In fact, heat source 104 can be any type of infrared heating element known to those skilled in the art.

Principal features of heat source 104 can be dictated by design constraints. In embodiments used for warming new born piglets, heat source 104 generally needs to raise the ambient temperature to about 95° F. over a relatively uniform area where the piglets lay. The desired heat source 104 also needs to operate at about 150 W with 120 VAC power. Therefore, in order to meet these design constrains, heat source 104 is preferably a radiative heating element that produces mostly infrared instead of visible light at a wavelength of 750 nm to 1 mm. In an embodiment, heat source 104 can be a tubular incoloy heating element 16 inches in length and 0.43 inches in diameter with an internal resistance of 100 ohms, operating at 144-150 watts, inclusive and any value in between, on 120 VAC. The impinging infrared radiation from heat source 104 readily transfers heat to the piglets. Heat source 104, however, is not, of and by itself, sufficient to provide the radiant heat necessary to warm the piglets. A shroud 102 comprising a reflective sheet 116 surrounded by an outer sheet 114 is specifically tuned to produce the needed heat of about 95° F. to the animals at the coverage area of the floor if hung at about 16 inches or 44 mm above the animals.

A reflective sheet 116 inside shroud 102 amplifies radiant heat from heat source 104 by reflecting infrared radiation downward toward the desired area. The parabolic shape of reflective sheet 116 also defines a volume of space 117 and through conduction and convection raises the temperature of air in the volume of space 117, the volume of hot air in the volume of space 117 itself radiating infrared radiation, with reflective sheet 116 directing it toward the desired area. Ideally, shroud 102 is also designed to minimize heat loss due to conduction and convection through the air away from the orientation of shroud 102.

Shroud 102 comprises a top side 105, a left side 106, and a right side 108 that is bent in the generally, parabolic-shape with an opening 110 opposite top side 105 that can be oriented toward the desired area of interest for reflective light to reach the piglets. Shroud 102 can further comprise of an outer sheet 114 and a reflective sheet 116 separated by an insulation gap 118. Insulation gap 118 can contain an insulation material or comprise air to form an insulation gap the purpose of which is to reduce heat loss of reflective sheet 116 by conduction to keep outer sheet 114 relatively cool to the touch.

Figure 3:
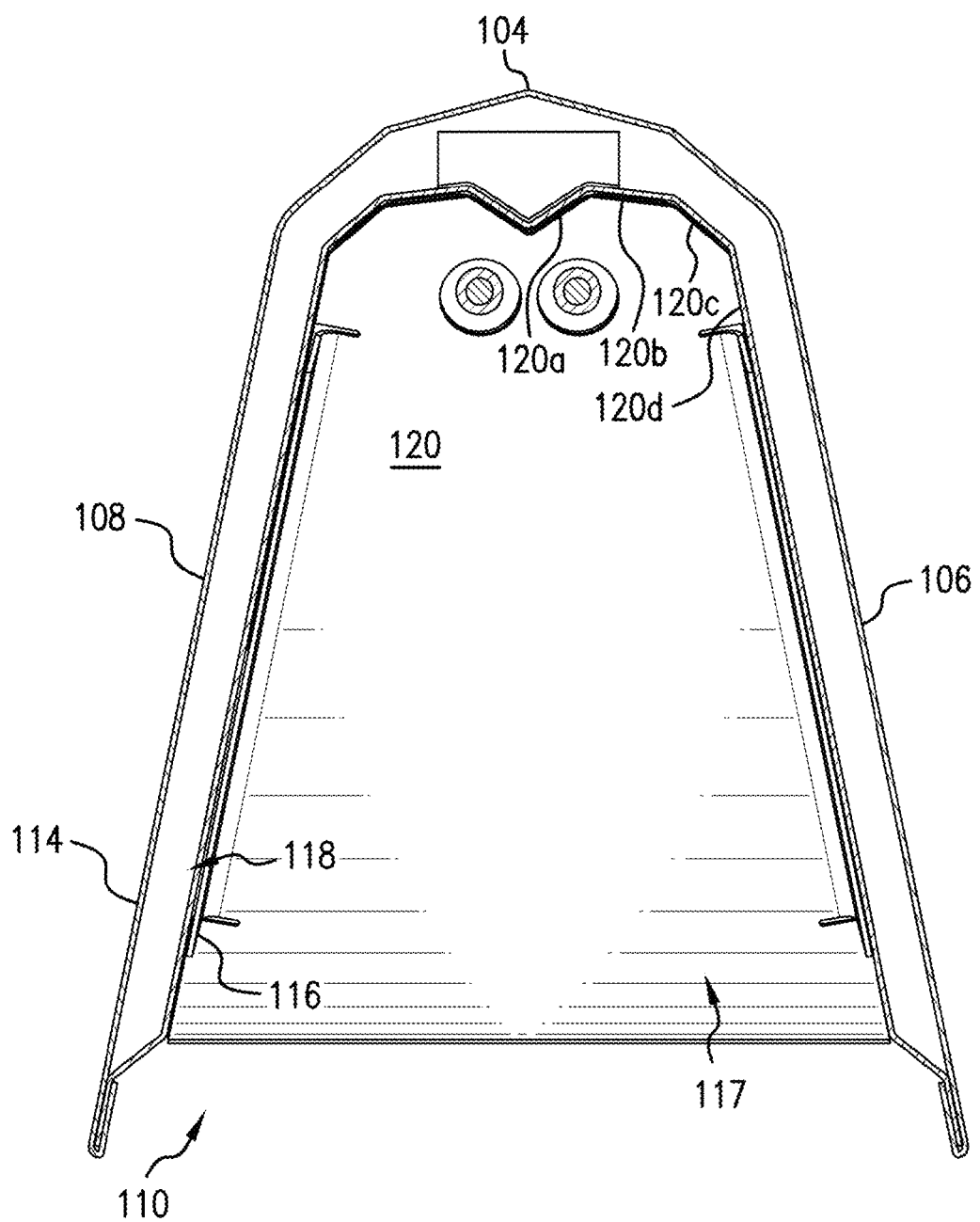
FIG. 3 is a side view of the shroud of FIG. 1.

Outer sheet 114 and reflective sheet 116 can be connected together to keep their relative positions fixed. The manner of connecting together in the illustrative embodiment shown in FIG. 3 comprises of folding inward the bottom of each left side 106 and right side 108 of outer sheet 114 and inserting the bottom of each left side and right side of reflective sheet 116 into the fold and crimping outer sheet 114 and reflective sheet 116 together at the respective right side and left side. Alternatively, shroud 102 can be formed of a single piece of sheet metal with or without inner sheet 116. Outer sheet 114 can be made of plastic since it doesn't overheat due to the design of reflective sheet 116 discussed below or made of a metal, such as aluminum which may be more durable. In other embodiments, as discussed below, outer sheet 114 and reflective sheet 116 can be loosely held together or fixed by heat resistive fasteners or sealant to minimize heat conduction from reflective sheet 116 to outer sheet 114.

Reflective sheet 116 of shroud 102 can be a smooth polished sheet of metal to form a heat reflective surface 120. Reflective sheet 116 may be made of any suitable reflecting material, e.g., stainless steel, such as acid proof stainless steel. In an embodiment, heat source 104 is an infrared heat light that emits infrared radiation with a wavelength of 750 nm to 1 mm. Much of the infrared radiation is directed downward from the bottom half of heat source 104. To maximize efficiency, heat reflective surfaces 120 reflect infrared radiation from the top hemisphere back down. Infrared light is reflected off heat reflective surfaces 120 relative to the angle of incidence from heat source 104. Heat reflective surfaces 120 are angled relative to each other to maximize the reflection of infrared light downward to improve efficiency by minimizing heating of shroud 102 and instead direct a maximum amount of infrared light downward toward the animal.

More specifically, reflective surfaces 120 are symmetrical about the longitudinal directional axis of shroud 102 with heat source being positioned in the center so each symmetrical half reflects a relatively equal amount of light rays downward. The light rays from the top half of heat source 104 are reflected off heat reflective surfaces 120 relative to the angle of incidence; for example, a light ray from to top half of heat source 104 is reflected off heat reflective surface 120a at an angle equal to its angle of incidence. This light ray is then directed to heat reflective surface 120d where it is reflected again. Heat reflective surface 120 can have multiple surfaces angled with respect to each other including heat reflective surface 120a, heat reflective surface 120b, heat reflective surface 120c, and heat reflective surface 120d to maximize the downward reflection of light rays. Each of these heat reflective surfaces 120a-120d can be formed with obtuse angles with respect to each other, including any angle between ninety and one hundred and thirty five degrees (or any angle in between). The goal is to maximize the downward reflection of light rays to the opening of shroud 102.

Furthermore heat reflective surface 120 is sufficiently long to aim the light rays downward toward a specific area commensurate with the area where the piglets tend to lay with respect to the sow. This allows the maximum amount of heat to the piglets which need it for growth without making the sow too hot, which is uncomfortable for the sow. Referring back to the description of heat source 104, a heating element 16 inches in length is sufficient to warm piglets laying in rectangular area of the same length and a width corresponding to the width of reflective surface 120.

At opposite ends of reflective sheet 116 inside the reflector and at each longitudinal end are positioned an end reflector 122. Each end reflector 122 can be in the form of a plate positioned inside the trough to reflect infrared light from heat source 104 downward. In this regard, each end reflector 122 can be positioned at an angle off perpendicular to maximize reflection.

Heat source 104 is positioned near the vertex of shroud 102 to maximize the efficiency. By heating the air in volume of space 117 around heat source 104 through convection, the heated air will emit heat too. So, by keeping heat source 104 close to the top and surrounding it with reflective surfaces 120 improves efficiency. The heated air is directed downward out of volume of space 117 towards the area of interest by reflective surfaces 120. As a result, volume of space 117 created by the generally parabolic shape of reflective surface 120 amplifies the resultant heat applied to the piglets beyond the radiative infrared heat from heat source 104. In essence, volume of space 117 functions as a heat amplifier to heat source 104.

Figure 6:
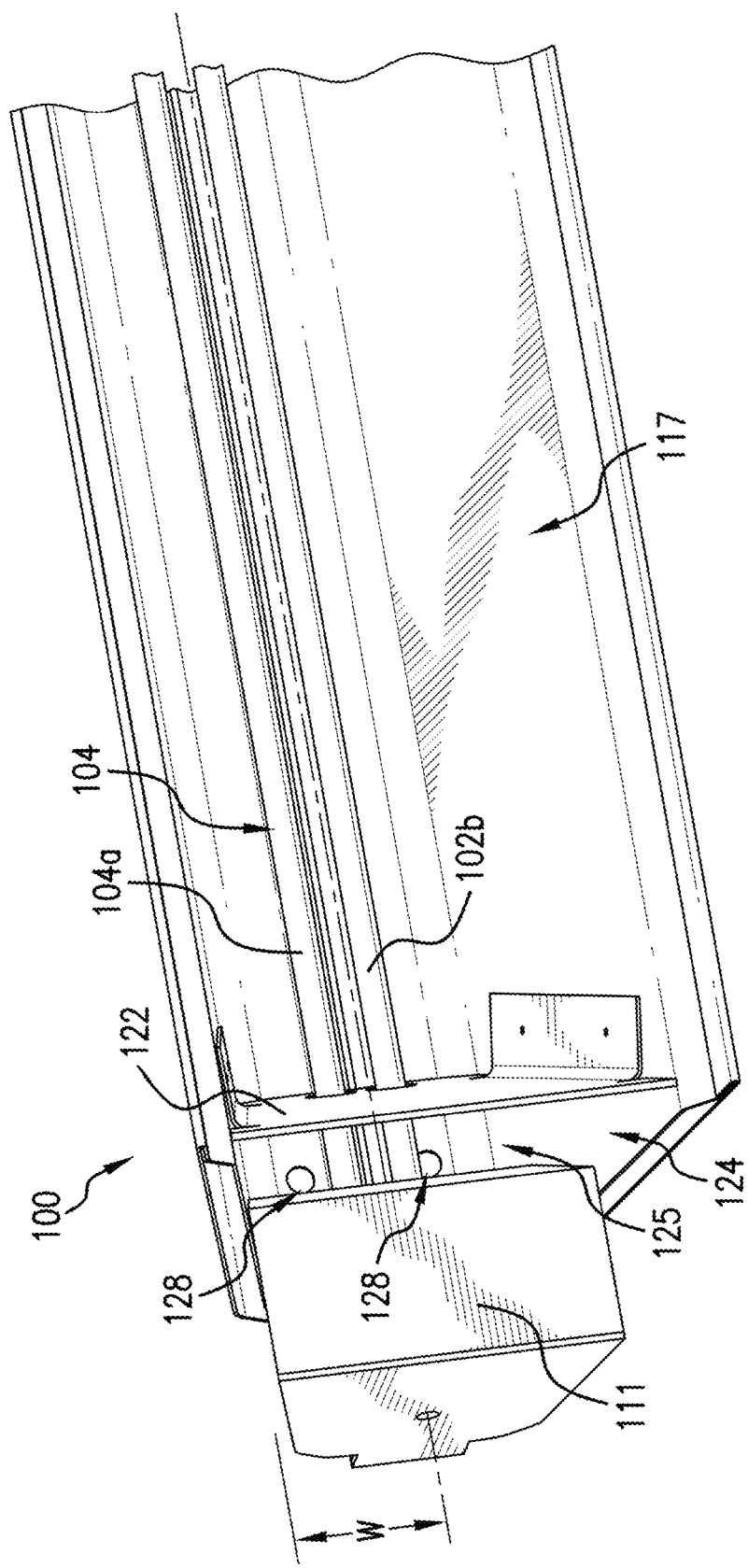
FIG. 6 is a bottom-side perspective view of the heat lamp of FIG. 1.
Figure 7:
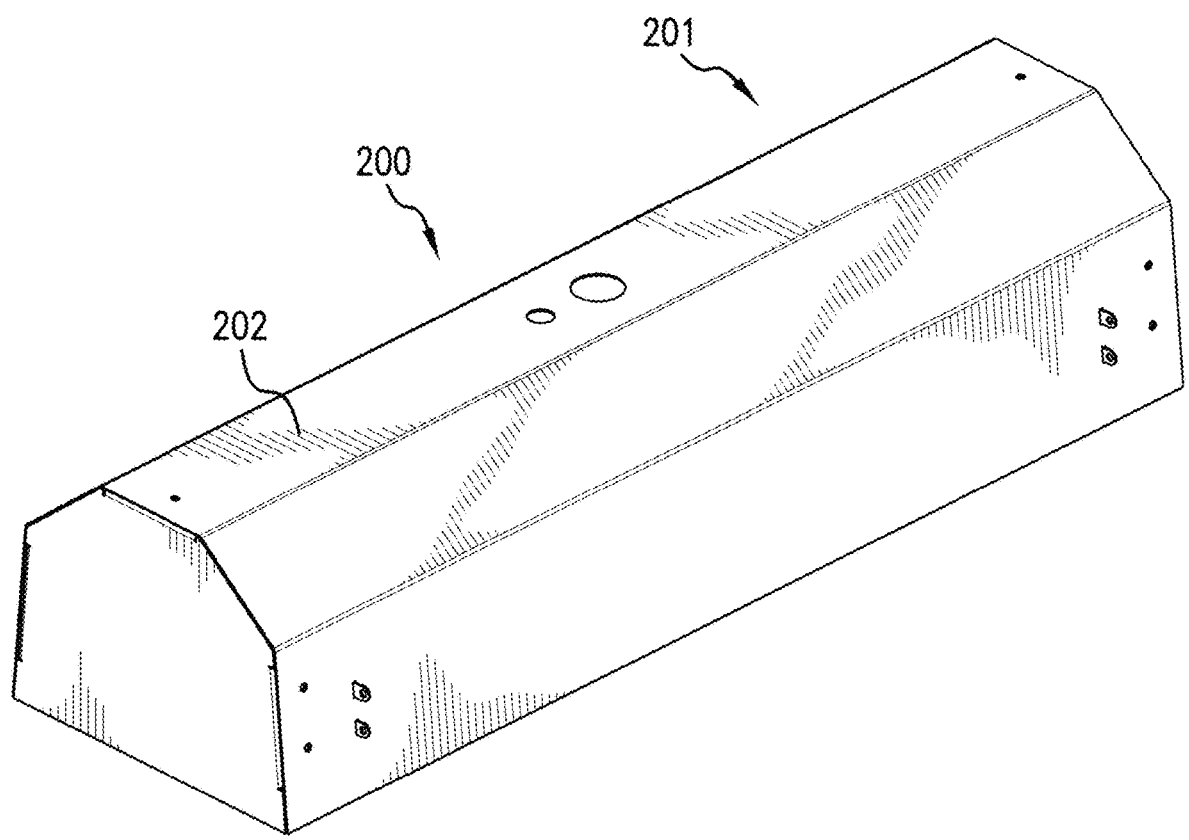
FIG. 7 is a front-side perspective view of a second embodiment of a heat lamp according to this disclosure.
Figure 8:
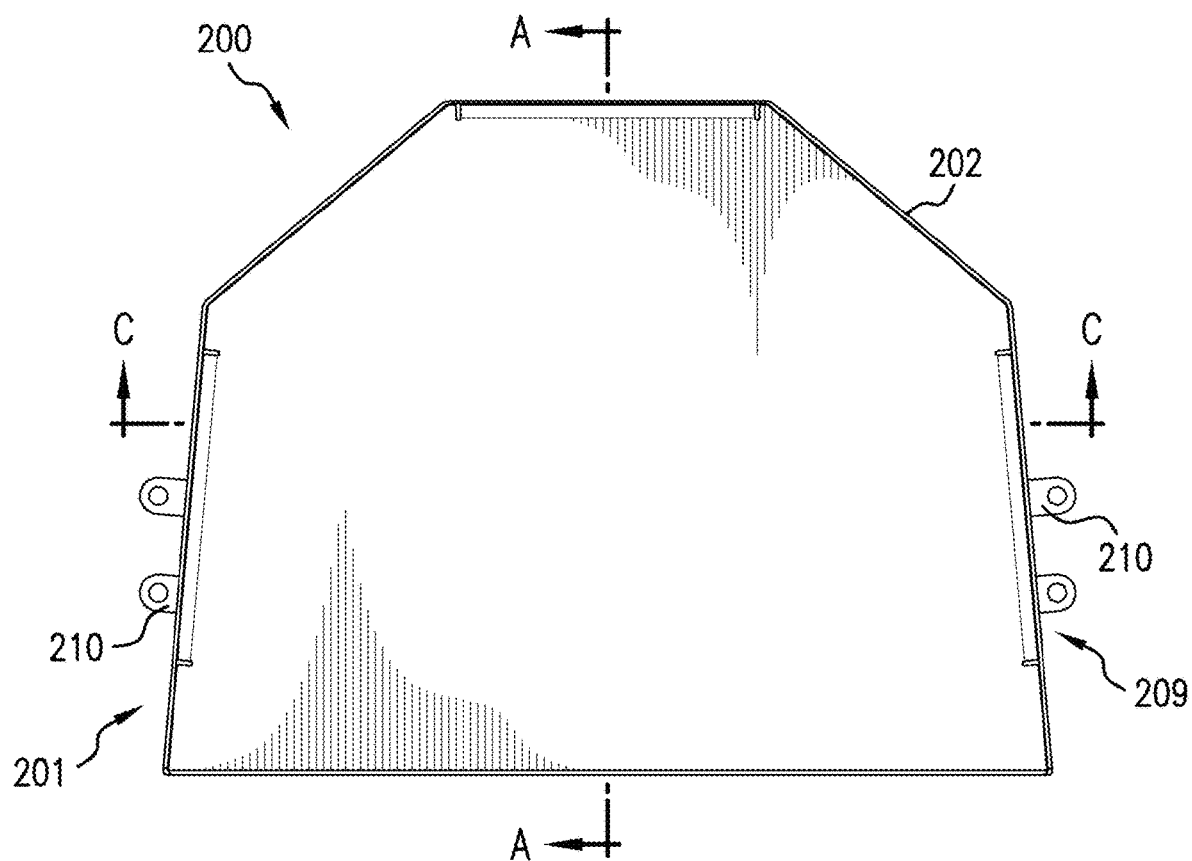
FIG. 8 is a left side view of the heat lamp of FIG. 7.
Figure 9:
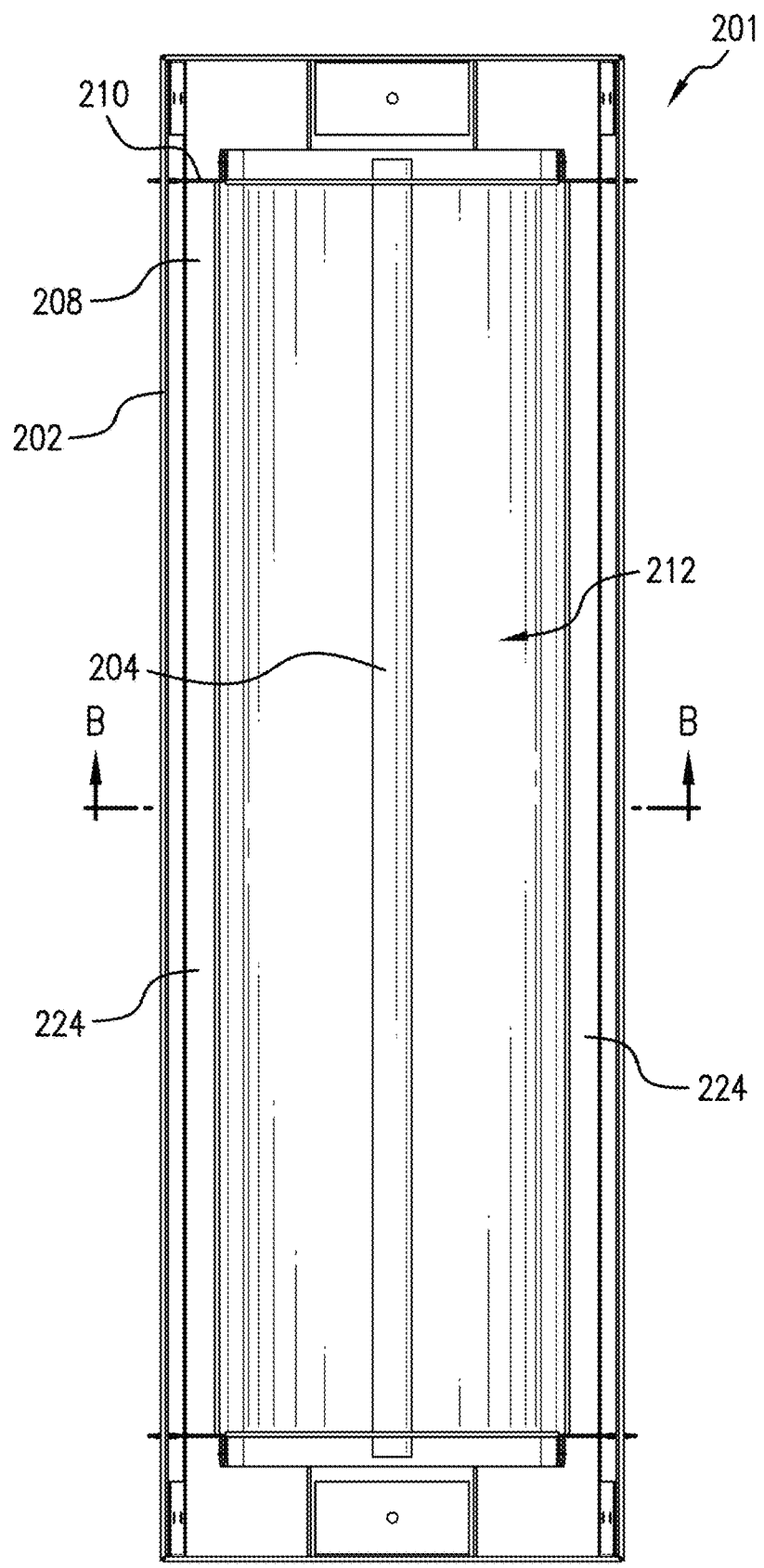
FIG. 9 is a bottom view of the heat lamp of FIG. 7.

Some of the heat from heat source 104 will inherently be transferred to the reflective sheet 116 and each end reflector 122 through conduction via the air between the element and reflective sheet 116. Overtime, this transfer of heat will cause the surfaces to heat, which could damage or melt electrical housing 111. To keep shroud 102 cool and move heat away from electrical housing 111 and connection block 129 at the other end, an air circulation channel 124 can be provided. Referring to FIG. 6, end reflector 122 is positioned apart from electrical housing 111 with a space 125 in between. At least one communicative hole 128 (also shown in phantom in FIG. 2) in reflective sheet 116 between end reflector 122 and electrical housing 111 is provided. Communicative hole 128 is the entrance to the area between reflective sheet 116 and outer sheet 114, which as can be seen in FIG. 1 is exposed to outside air. This creates air circulation channel 124 from space 125 into at least one communicative hole 128 and out an insulation gap 118, which is the space between reflective sheet 116 and outer sheet 114, for circulating air between end reflector 122 and electrical housing 111 to keep electrical housing 111 cool. Insulation gap 118 can be open to the air, filled with insulation, or comprise a combination of the two.

FIGS. 7-12 illustrate a second embodiment of a heat lamp 200 according to this disclosure. Heat lamp 200 comprises of a shroud 201 and heat source 204. Shroud 201 comprises of an outer sheet 202 and a reflective sheet 206 that is generally parabolic shaped to define a volume of space 217 that functions as a heat amplifier, as described above, which directs radiant heat directly downward out of the opening, i.e. a first emission area 212.

The difference in the second embodiment is that the outer sheet 202 and reflective sheet 206 are separated by an insulation gap 208 similarly having a parabolic shape corresponding to the profile of reflective sheet 206 with openings 213 directed on opposite sides toward the area of interest to simultaneously insulate the outer sheet 202 from reflective sheet 206 to reduce heat loss from conduction and directing air heated by convection inside insulation gap 208 out the openings 213 towards the area of interest. As such, insulation gap 208 forms a second volume of space with an opening, i.e. a second emission area 211 that is open to the environment by openings 213. In addition to the air around heat source 204 being heated by convection and directed downward toward the area of interest, a second volume of air in the second volume of space is also heated by convection and directed downward out second emission area 211 toward the area of interest. In essence, first emission area 212 and second emission area 211 function as heat amplifiers to heat source 104. Like the first embodiment, insulation or a combination of insulation and air can be added in insulation gap 208 to reduce heat loss or to reduce the heat amplification out of second emission area 211.

Outer sheet 202 is generally a u-shaped or parabolic-shaped with bilateral symmetry along a longitudinal length longer that is longer than its width. It can be formed from a single piece of material (e.g. aluminum or plastic) with hemmed edges for strength and to prevent cuts. The side ends are attached to each end of the sheet by rivets or welds to create a unitary structure for outer sheet 202.

Reflective sheet 206 has a parabolic shape to reflect heat from heat source 204 downward in the same manner as described above. It too can be formed from a single piece of reflective material with hemmed edges for strength and to prevent cuts. As described above, the parabolic shape of reflective sheet 206 can be determined mathematically.

At opposite ends of reflective sheet 206 inside shroud 201 and at each longitudinal end are positioned an end reflector 222. Each end reflector 222 can be in the form of a plate positioned inside the trough to reflect infrared light from heat source 204 downward. In this regard, each end reflector 222 can be positioned at an angle off perpendicular to maximize reflection. Each end reflector 122 comprises tabs 210 that extend into corresponding slots 215 in outer sheet 202 to minimize conduction of heat from reflective sheet 206 to outer sheet 202. Reflective sheet 206 also further comprises tabs 217 on respective ends thereof, and wherein end reflector 222 comprises of corresponding slots 219 to receive tabs 217 of reflective sheet 206 to combine reflective sheet 206 to each end reflector 222 while minimizing conduction of heat from reflective sheet 206 to each end reflector 222. The respective tabs 210 and tabs 217 are not fixed but rather float inside the respect slots 215 and slots 219. This reduces heat transfer to keep the exterior of heat lamp 200 cool to the touch. Tabs 210 and tabs 217 can also be configured as heat resistive fasteners.

Each end reflector 222 also comprises a receiving hole 221 with at least two nubs 223, preferably three numbs 223, projecting into receiving hole 221 for an effective diameter equal to a diameter of heat source 204 to minimize conduction of heat from heat source 204 to end reflector 222 which minimizes conduction of heat to reflective sheet 206 and outer sheet 202.

Like the first embodiment, heat source 204 comprises a resistive infrared heating light that extends the longitudinal length of shroud 201. While only one heat source 204 is shown, like the first embodiment, multiple heat sources or different shapes of heat sources can be used. The electrical connections from the AC power cord to the electrical circuit elements are located in the area between outer sheet 202 and reflective sheet 206.

Figure 5:
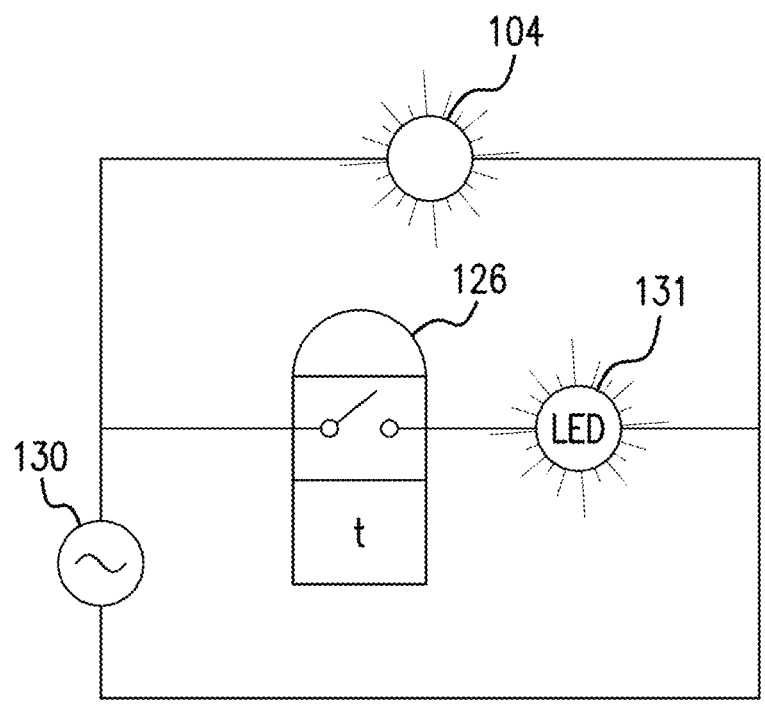
FIG. 5 is an electrical schematic for powering the heat lamp of FIG. 1.
Figure 10:
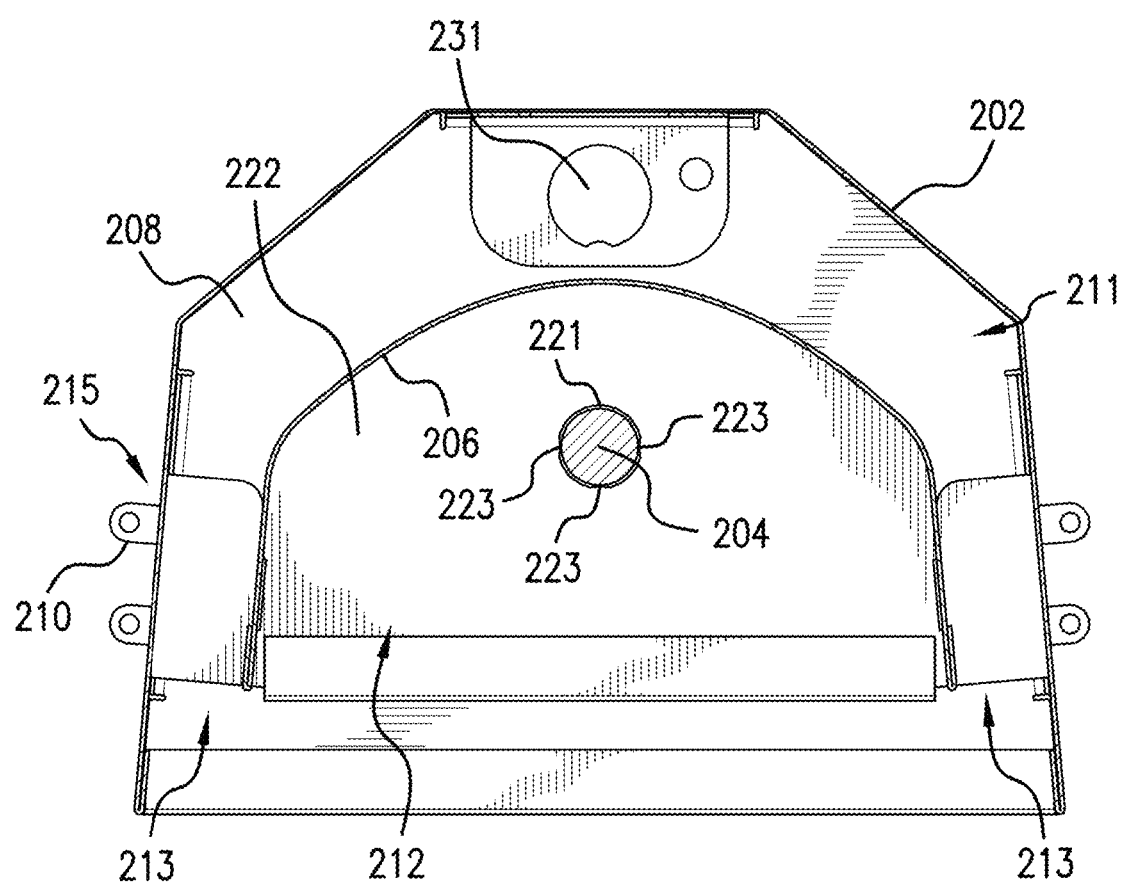
FIG. 10 is a sectional view taken along the line B-B of FIG. 8.
Figure 11:
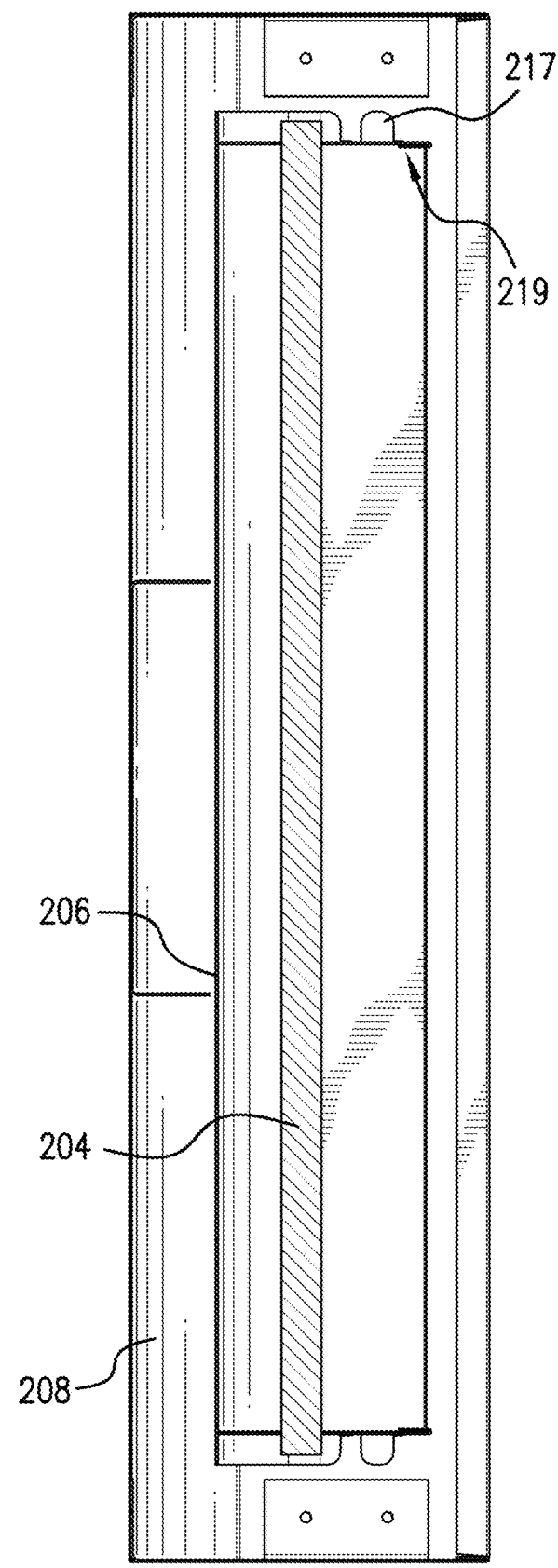
FIG. 11 is a sectional view taken along the line A-A of FIG. 8.
Figure 12:
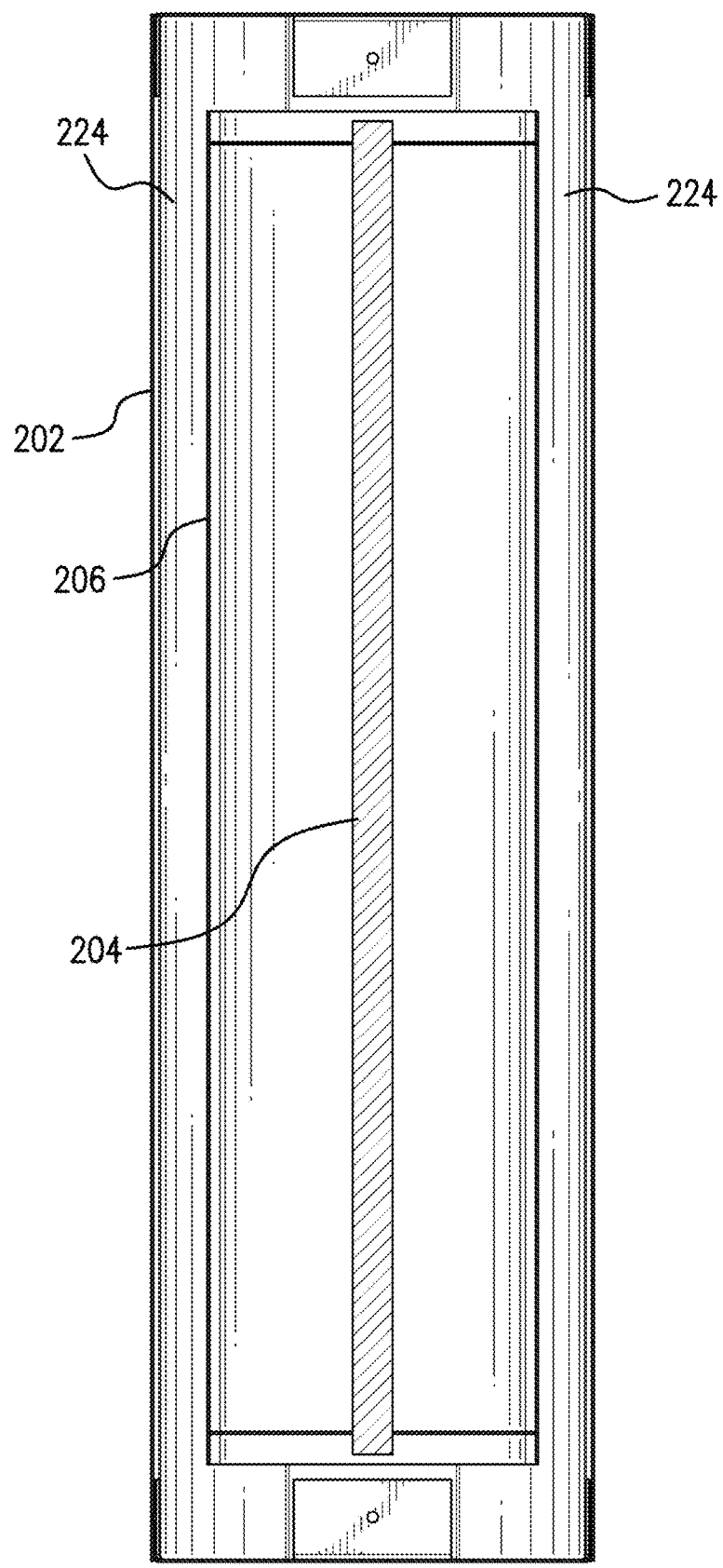
FIG. 12 is a sectional view taken along the line C-C of FIG.

Turning to FIG. 10, which shows a cross-sectional view, the power cord comes in through the top in a sealable coupling 220 and electrically connects to heat source 204 and an indicator light 231 in a manner similar to that shown in FIG. 5 for the first embodiment. In this embodiment, however, indicator light 231 is positioned between outer sheet 202 and reflective sheet 206 of shroud 201 to reflect light downward and out a bottom 224. This create a lighted area surrounding the reflected light from heat source 204 to provide a visual indication of the boundary area for the heating area as well as lighting.

Heat source 104 or heat source 204 can be powered according to the circuit shown in FIG. 5, discussed in more detail below. With reference to the first embodiment of FIGS. 1-6, the electrical connections from the AC power cord to the electrical circuit elements can be enclosed in an electrical housing 111. Electrical housing 111 can be formed of any non-corrosive, non-heat conductive material, including, but not limited to, plastic. But, in order to prevent electrical housing 111 from being damaged by the heat from heat source 104, shroud 102 is specially designed to channel heat away. With reference to the second embodiment of FIGS. 7-12, the electrical connections for heat source 204 extend from the AC power cord to the electrical circuit elements located in the area between outer sheet 202 and reflective sheet 206.

Returning to FIG. 5, which shows the electrical schematic, heat source 104 is connected to an AC source 130. The manner in which this is most often carried out is with a three-prong plug attached to a power cord with the end leads connected to heat source 104 and the ground lead to shroud 102 with the connection points being inside electrical housing 111. A switch in series between AC source 130 and heat source 104 can be provided near heat lamp 100 to facilitate easy on/off or it can be omitted, as illustrated, with heat lamp 100 being simply plugged in and unplugged. The same circuit is useable for the second embodiment.

In an embodiment, a normally open electrical thermostat 126 is electrically connected in parallel with heat source 104 and in series with an indicator light 131. In operation, heat source 104 is immediately turned on when powered by AC source 130. Once the temperature rises to a threshold level set with thermostat 126, thermostat 126 closes and provides power to indicator light 131 to signify that heat lamp 100 is operational. A normally closed thermostat can be positioned in series between AC source 130 and heat source 104 set at a high threshold level to turn heat source 104 off when heat lamp 100 reaches a certain temperature as an additional protective measure to prevent electrical housing 111 from melting or otherwise being damaged.

Figure 4:
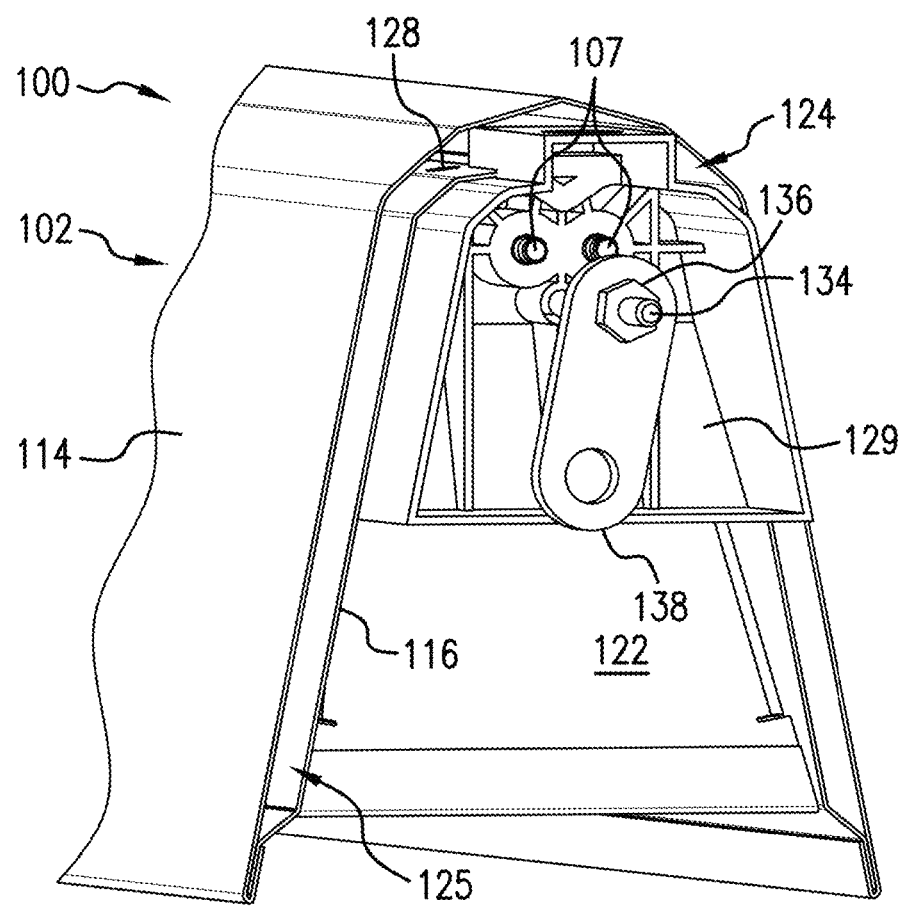
FIG. 4 is a side-view of the heat lamp of FIG. 1.

Turning to FIG. 4, a side view of heat lamp 100 is shown illustrating the position of thermostat 126. The leads to thermostat 126 are connected to AC source 130 and indicator light 131 inside electrical housing 111. The outside of thermostat 126 is positioned in insulation gap 118 between reflective sheet 116 and outer sheet 114 of shroud 102 to accurately measure the temperature near electrical housing 111. In the second embodiment, thermostat 126 along with the other circuit elements are in the area between outer sheet 202 and reflective sheet 206.

Returning to FIG. 1, heat lamp 100 can also be configured at opposite longitudinal ends with a tension hanger 134. Tension hanger 134 is a shaft that extends end to end to hold electrical housing 111 at one end and to a connection block 129 at the other end together. Tension hanger 134 can be implemented as a rod with threads at each end with a spring washer to create the tension and a locking nut 138 to secure each end. Turning to FIG. 4, connection block 129 is shown with tension hanger 134 extending out its end so that when tightened connection block 129 and electrical housing 111 are pulled together tight. Threaded ends 107 of the two resistive infrared heating elements 104*a*, 104*b* can be seen protruding from connection block 129 to hold these tight in shroud 102 too.

Shroud 102 can be oriented in any direction by a hook plate 136 that is positioned on the shaft of tension hanger 134 and is rotatable with respect thereto. Hook plate 136 is selectively fixed in position by the manual tightening of a locking nut 138 that fixes the relative position of hook plate 136 to shroud 102. In this regard, hook plate 136 is selectively fixable relative to shroud 102 to angle shroud 102 and heat source 104 in various positions. This allows heat lamp 100 to be hung from the ceiling and tilted to any particular orientation for maximum direction of heat towards the piglets. In the second embodiment, the shroud 201 can be balanced by the location of the AC power cord being in the center of shroud 201. The AC power cord comes in through the top in the sealable coupling 220 which secures itself to the AC power cord.

Figure 13:
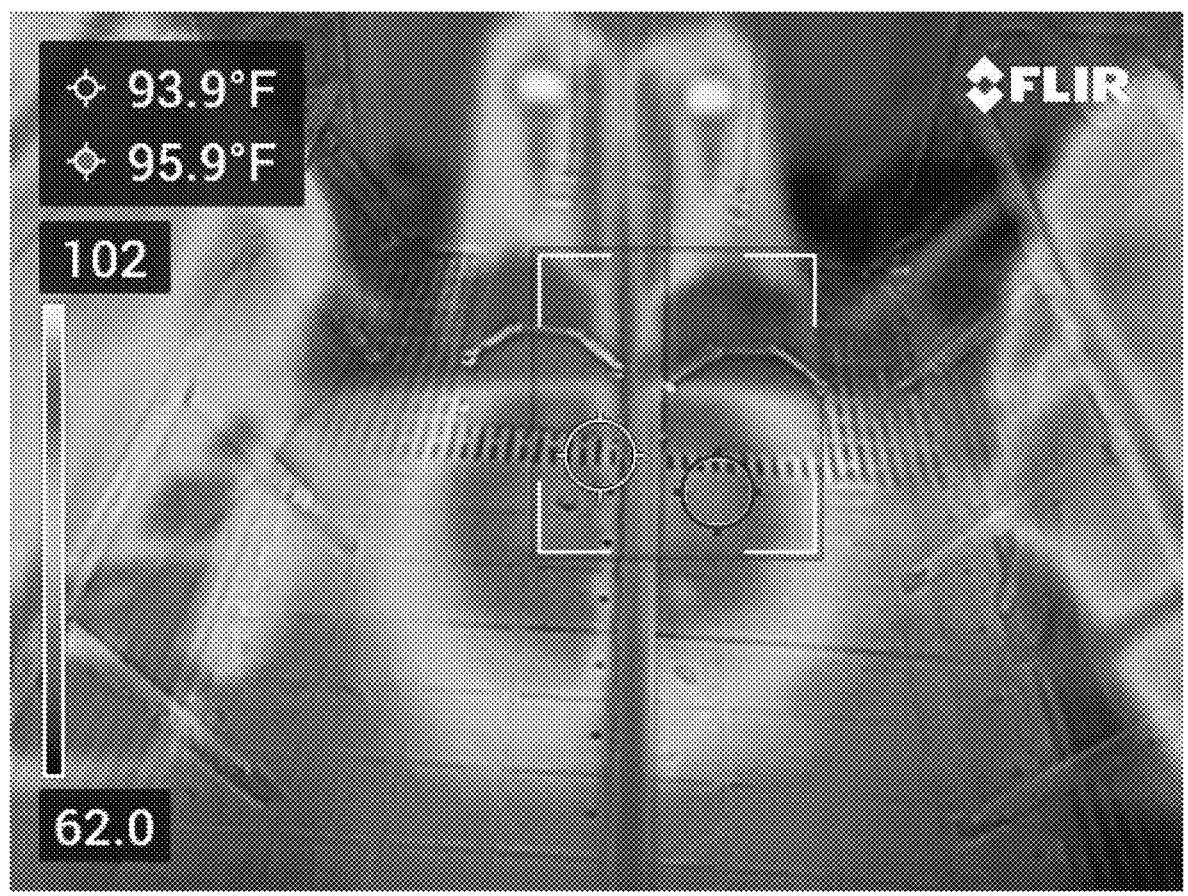
FIG. 13 shows an infrared heat signature of the heat lamp according to this disclosure.

Referring to FIG. 13, shown is an infrared heat map of the coverage area of the floor below heat lamp 200 according to this disclosure. It can be seen that the heat is directed straight down from heat lamp 200 and does not radiate out towards the sow. This means that the piglets, for example, will be drawn to the heated area away from the sow to minimize accidental layons. Unlike prior art heat lamps that create a penumbra that increases and decreases in size as the heat lamp is moved away and toward the floor, heat lamp 200 according to this disclosure directs radiant heat directly downward out of the emission areas, so that the total emission area is substantially equal to the coverage area of heat lamp 200 irrespective of a height of the heat lamp from the floor. This is necessary to keep the coverage area away from the sow to prevent layons.

The foregoing discloses a heat lamp that incorporates infrared tubular heat sources successfully engineered to operate at around 150 watts. At this relatively low power level, the heat lamp emits the required radiation to warm the animals and limits energy losses due to convection and conduction. It does so without the use of glass sealing to shield the heat source from draughts and air currents that would otherwise reduce its efficiency by way of a uniquely shaped reflective surface to create one or more volumes of spaces to function as heat amplifiers.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

We claim:

1. A heat lamp for heating a coverage area on a floor, the heat lamp comprising:
    a heat source that emits infrared radiation;
    a reflective sheet surrounding the heat source with a first emission area tuned to direct infrared energy directly downward out of the first emission area;
    an outer sheet surrounding the reflective sheet with an insulation gap between the outer sheet and the reflective sheet with a second emission area directed downward out of the insulation gap, wherein a total emission area of the heat lamp comprises of the first emission area plus the second emission area, wherein the total emission area is substantially equal to the coverage area of the heat lamp; and
    an end reflector positioned on opposite ends of the reflective sheet to combine the reflective sheet to the outer sheet, wherein each end reflector comprises of tabs that extend into corresponding slots in the outer sheet to minimize conduction of heat from the reflective sheet to the outer sheet.

2. The heat lamp of claim 1, wherein the reflective sheet further comprises tabs on respective ends thereof, and wherein the end reflector comprises corresponding slots to receive the tabs of the reflective sheet to combine the reflective sheet to each end reflector while minimizing conduction of heat from the reflective sheet to each end reflector.

3. The heat lamp of claim 2, wherein each end reflector comprises a receiving hole with at least two nubs projecting into the receiving hole for an effective diameter equal to a diameter of the heat lamp to minimize conduction of heat from the heat lamp to the end reflector which minimizes conduction of heat to the reflective sheet and the outer sheet.

4. The heat lamp of claim 3, wherein each end reflector has a reflective surface to direct infrared radiation away from the outer sheet.

5. The heat lamp of claim 1, further comprising a heat amplifier formed by the insulation gap between the reflective sheet and the outer sheet, wherein the heat amplifier emits heat by way of conduction out of the second emission area to the coverage area.

6. The heat lamp of claim 1, wherein the reflective sheet is elongated with bilateral symmetry along a longitudinal axis with the reflective sheet folded to a generally parabolic-shape profile around the heat source.

7. The heat lamp of claim 1, wherein the reflective sheet further comprises of a plurality of heat reflective surfaces to maximize heat reflection downward out of the first emission area.

8. The heat lamp of claim 7, wherein the plurality of heat reflective surfaces further comprise at least three heat reflective surfaces each of which is connected to its adjacent heat reflective surface at an obtuse angle to maximize reflection.

9. The heat lamp of claim 1, wherein the heat source is an infrared heating element.

10. The heat lamp of claim 9, wherein the reflective sheet is a polished reflective surface to reflect infrared radiation from the infrared heating element.

11. The heat lamp of claim 1, and further comprising a tension hanger extending a longitudinal length of the outer sheet to combine an electrical housing at one end to a cap at the other end, wherein the tension hanger further comprises of a threaded rod, and further comprising a hook plate positioned on the tension hanger and rotatable about the threaded rod, and a locking nut that fixes a relative position of the hook plate to the outers sheet.

12. The heat lamp of claim 1, wherein the total emission area of the heat lamp comprises of a substantially even heat distribution at the coverage area.

13. A heat lamp for heating a coverage area on a floor, the heat lamp comprising:
    a heat source that emits infrared radiation;

a reflective sheet surrounding the heat source with a first emission area tuned to direct infrared energy directly downward out of the first emission area;

an outer sheet surrounding the reflective sheet with an insulation gap between the outer sheet and the reflective sheet with a second emission area directed downward out of the insulation gap, wherein a total emission area of the heat lamp comprises of the first emission area plus the second emission area, wherein the total emission area is substantially equal to the coverage area of the heat lamp; and an indicator light connected in parallel to the heat source to project light out of the second emission area to provide a visual indication of the total emission area.

14. The heat lamp of claim 13, further comprising a normally open electrical thermostat electrically connected between the indicator light and a power source that closes when a temperature in the insulation gap reaches a threshold level to signify that the heat source is operational.

* * * * *